United States Patent [19]

Matthews et al.

[11] 4,448,478

[45] May 15, 1984

[54] FIBER OPTIC CONNECTOR

[75] Inventors: Maurice A. Matthews, Basingstoke; Michael J. Cook, Thatcham; David E. Ivey, Whitchurch, all of England

[73] Assignee: International Telephone & Telegraph Corporation, New York, N.Y.

[21] Appl. No.: 312,428

[22] Filed: Oct. 19, 1981

Related U.S. Application Data

[63] Continuation of Ser. No. 142,341, Apr. 21, 1980, abandoned.

[30] Foreign Application Priority Data

May 8, 1979 [GB] United Kingdom ............... 7915872

[51] Int. Cl.³ ............................................... G02B 7/26
[52] U.S. Cl. ................................................ 350/96.21
[58] Field of Search ............... 350/96.18, 96.20, 96.21, 350/96.22

[56] References Cited

U.S. PATENT DOCUMENTS

| | | | |
|---|---|---|---|
| 3,950,075 | 4/1976 | Cook et al. | 350/96.22 |
| 3,963,323 | 6/1976 | Arnold | 350/96.22 |
| 3,984,174 | 10/1976 | Landgreen | 350/96.22 |
| 4,008,948 | 2/1977 | Dalgleish et al. | 350/96.21 |
| 4,101,198 | 7/1978 | Heldt | 350/96.20 |
| 4,119,362 | 10/1978 | Holzman | 350/96.18 |
| 4,290,667 | 9/1981 | Chown | 350/96.18 |

FOREIGN PATENT DOCUMENTS 2273289 12/1975 France ........................... 350/96.21

Primary Examiner—John D. Lee
Attorney, Agent, or Firm—T. L. Peterson

[57] ABSTRACT

In a fiber optic connector element two or more fiber optic cables are each terminated in a ferrule whose end contains a beam expanding lens. The ferrules are tapered and each of them fits into a correspondingly tapered hole in an insert within the body of the connector element. The ends of the ferrules are substantially in the same plane and are adjacent to a transparent window which is mounted in a bezel surrounding the insert. When two such connector elements are mated, their windows are close to each other and parallel to each other, and each ferrule in one element is optically aligned with a ferrule in the other element. The casings and bodies of the connector elements may be constructed hermaphroditically.

4 Claims, 5 Drawing Figures

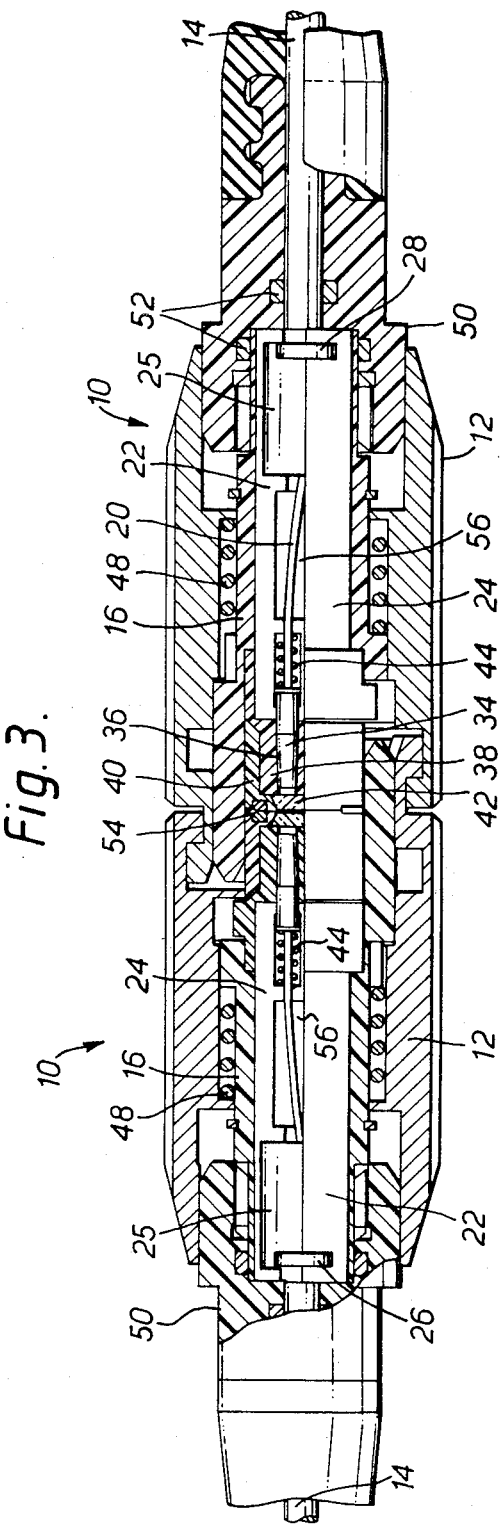

FIBER OPTIC CONNECTOR

This is a continuation of application Ser. No. 142,341, filed Apr. 21, 1980 (now abandoned).

BACKGROUND OF THE INVENTION

The present invention relates to an optical fiber connector.

In the design of optical fiber connectors it is necessary for the mating connector elements to mate with the fibers in the two elements accurately aligned one with the other to minimize light transmission losses. An object of this invention is to provide a connector in which low loss mating is achieved. Prior art references which may be considered pertinent to the invention are U.S. Pat. Nos. 3,455,625; 3,963,323; 3,984,174; 4,047,797; 4,088,390 and 4,184,742.

SUMMARY OF THE INVENTION

According to a principal aspect of the invention there is provided an optical fiber connector element which includes a body embodying a front end portion having a plurality of axially extending tunnel-like cavities therein each of which receives a ferrule adapted to terminate an optical fiber. The forward ends of the ferrules all lie substantially in the same plane, which plane is substantially normal to the longitudinal axes of the ferrules. A cover piece of an optically transparent material closes the front end portion of the body. The ends of the ferrules are positioned close to the inner surface of the transparent cover piece. When two such connector elements are mated, their transparent cover pieces are close to and parallel to each other with the ferrules in one of the elements optically aligned with the ferrules in the other of the elements.

BRIEF DESCRIPTION OF THE DRAWINGS

FIG. 3 is a partial longitudinal sectional view of two mated connector elements embodying the invention;

DESCRIPTION OF THE PREFERRED EMBODIMENTS

Figure 1:
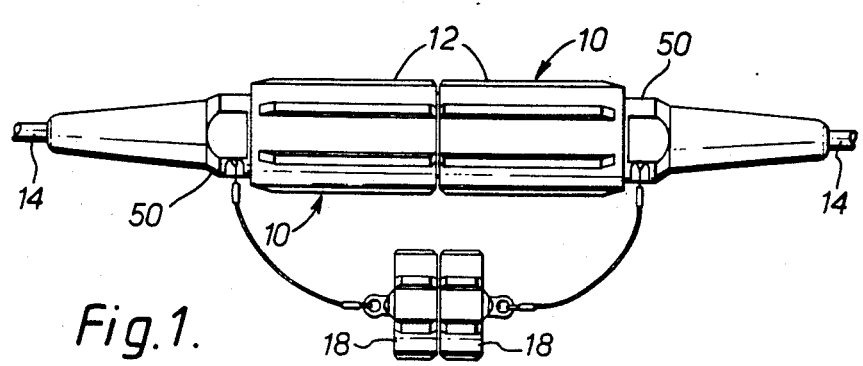
FIG. 1 is a side view of two mated connector elements each of which embodies the invention.

FIG. 1 shows two connector elements 10 of the present invention coupled together. Each connector element has an external ribbed coupling nut 12 of substantial proportion (compared with the size of the optical fiber cables 14 terminated to the connector elements). The connector shell portions 16 of the elements 10 are of hermaphroditic form facilitating the engagement and coupling of the free connector elements in adverse condition, e.g. in poor light. Each of the elements is provided with a dust cover 18 which, when the elements are not in use, are fitted over the front ends of the elements. When two elements are mated, as shown in FIG. 1, their dust covers are fitted together, as shown, for convenience.

Figure 2:
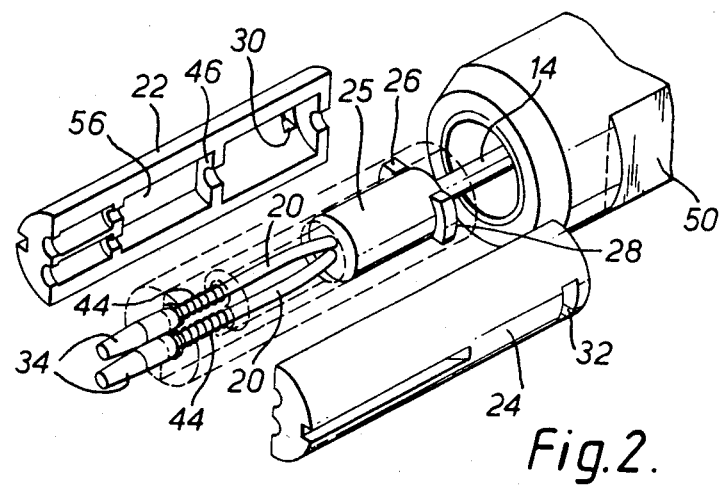
FIG. 2 is an exploded view of parts of one connector element to which the invention may be applied.
Figure 5:
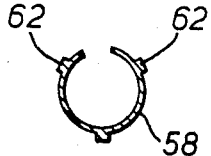
FIG. 5 is an elevational view of a shear ring used in the connector element of FIG. 4.

FIG. 2 shows the assembly of part of one connector element 10 before it is fitted into its connector shell 16. The portion in which the jacketed optical fibers 20 of the cable 14, two in this example, are mounted consists of two semi-cylindrical moldings 22 and 24 which are fitted together over the fibers to form a cylinder shown in phantom in FIG. 2.

The two fibers 20 extend through a casing 25 which contains a cable retention arrangement. The casing 25 has sideways extended tails 26, 28 which fit into slots 30 and 32 in the two moldings 22 and 24, respectively.

In FIG. 3 one molding of the two connector elements 10 is each shown half cut away to expose the arrangements associated with one optical fiber and its ferrule for each element. Each fiber 20 is terminated in a ferrule 34 which, as can be seen from FIGS. 2 and 3, is shaped on its outside rather like a beer tumbler, the fiber going into the larger rear end of the ferrule. The narrow front end preferably contains a lens arrangement of the expanded beam type (not shown).

The forward end portions of the two ferrules fit into respective tapered tunnels 36 in an insert 38 which has a larger rear end that slidably fits over the end of the cylinder formed by the two moldings 22 and 24. The forward end of the element 10 is completed by a bezel 40 of generally cylindrical form whose front end is sealed closed by a window 42 of glass or other suitable optically transparent material. The bezel is slidably mounted over the insert 38 so that the bezel may be removed to clean the inside of the window 42 and to clean or replace the ferrules 34. The front ends of the ferrules are spaced a short distance behind the window to prevent scratching of the (optical fibers) lenses in the ferrules.

The glass window 42 protects the ends of the ferrules in the unmated condition, and can be readily cleaned if any dirt collects on it. In fact, it is usually desirable to clean such window before mating the two connector elements. When the two elements are mated, as shown, it will be seen that the two windows are close to each other and parallel with each other. Further, the connector elements 10 are so constructed that when the two connector elements are mated, each ferrule 34 in one element is aligned with the corresponding ferrule in the other element. The presence of the expanded beam arrangements in the two ferrules takes care of slight inaccuracies of alignment which may arise due to manufacturing tolerances, and allows the separation of the mating ferrules by the windows 42 without significantly decreasing the light transmission of the connector.

The ferrules 34 are urged forward by coil springs 44 into the tapered tunnels 36 in the insert 38. The springs react against stops 46 provided by the internal configuration of the moldings 22, 24 (see FIG. 2). Note that the cylinder formed by the moldings is analogous to the insulator of an electrical connector and in fact is usually referred to as an insulator.

Additional springs 48 exert a rearward thrust on the inside of the coupling nuts 12 which urge the mating connector elements together when mated, and also secure the dust covers in place when the latter are fitted.

The cables 14 pass through rear insulators 50 mounted over the rear portions of shells 16. O-rings 52 inside the rear insulators are compressed when the connector elements are fully assembled with the coupling nuts screwed together. In addition to the O-rings 52, the bezels 40 carry O-rings 54 on their front faces which are compressed together when the elements are mated. Thus the connector arrangement is fully sealed at all times against the ingress of moisture.

The provision of a chamber 56 within the cylinder 22, 24 between the cable retention arrangement 25 and the ferrules 34 and springs 44 allows for the increased diameter of the cable sheath diameter, which could result from cutting the cables and splicing in new cables with ferrules, as may be needed with in service.

Much of the rest of the connector elements shown follows relatively conventional practice and so it is not described in detail. However, the coupling nuts 12 are hermaphroditic, as can be seen.

In the connector elements described above, the ferrules are of tapered shape. However, such connector elements can be readily made for use with fibers terminated by parallel-sided ferrules, which would have the merit of being simpler to make.

Figure 4:
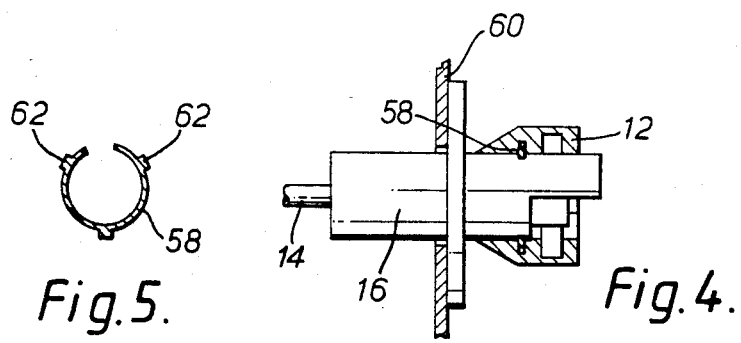
FIG. 4 is a partial sectional view showing one connector element secured to a wall.

FIG. 4 shows a safety feature built into the fixed "half" of a connector assembly: it includes a shear ring 58 which forms the internal coupling between the shell 16 and coupling nut 12 of the fixed half. It will be seen that the shell 16 is secured to a wall 60 (or equipment box). Hence, if the connector when mated is subjected to an excessive pull, the tabs 62 on the shear ring 58 will break before any damage can occur to the optical fiber cable 14.

What is claimed is:

1. An optical fiber connector element comprising:
   a body embodying a front end portion having a plurality of axially extending tunnel-like cavities therein;
   a ferrule in each said cavity adapted to terminate an optical fiber, each said ferrule having a lens adjacent to its forward end, said ferrules lying in a predetermined pattern;
   the forward ends of said ferrules all lying substantially in the same plane, said plane being substantially normal to the longitudinal axes of said ferrules;
   a single cover piece of an optically transparent material closing said front end portion of said body, the perimeter of said cover piece surrounding said pattern of ferrules;
   the forward ends of said ferrules being positioned close to the inner surface of said transparent cover piece; and
   when two said connector elements are mated, their transparent cover pieces are close to and parallel to each other with the ferrules in one of said elements optically aligned with the ferrules in the other of the elements, the lenses in the mating ferrules in said connector elements allowing efficient light transmission through the mating connector elements in spite of the separation of the mating ferrules by said cover pieces.

2. An optical fiber connector element as set forth in claim 1 wherein:
   said lens is an expanded beam lens.

3. An optical fiber connector element as set forth in claim 1 wherein:
   said cover piece is mounted in a bezel slidably mounted over said front end of said body so that said cover piece may be removed for cleaning.

4. An optical fiber connector comprising:
   a pair of mating connector elements, each said element comprising:
   a body embodying a front end portion having a plurality of axially extending tunnel-like cavities therein;
   a ferrule in each said cavity adapted to terminate an optical fiber, each said ferrule having a lens adjacent to its forward end, said ferrules lying in a predetermined pattern;
   the forward ends of said ferrules all lying substantially in the same plane, said plane being substantially normal to the longitudinal axes of said ferrules;
   a single cover piece of an optically transparent material closing said front end portion of said body, the perimeter of said cover piece surrounding said pattern of ferrules;
   the forward ends of said ferrules being positioned close to the inner surface of said transparent cover piece; and
   when said connector elements are mated, their transparent cover pieces are close to and parallel to each other with the ferrules in one of said elements optically aligned with the ferrules in the other of the elements, the lenses in the mating ferrules in said connector elements allowing efficient light transmission through the mating connector elements in spite of the separation of the mating ferrules by said cover pieces.

* * * * *